Figure 1A:
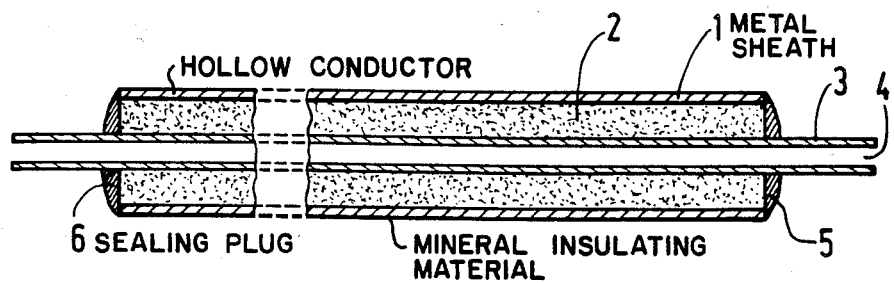

United States Patent [19]

Bailleul et al.

[11] Patent Number: 4,679,317
[45] Date of Patent: Jul. 14, 1987

[54] SCREENED CABLE INSULATED BY MEANS OF MINERAL INSULATION MATERIAL AND METHOD OF MANUFACTURING SUCH A CABLE

[75] Inventors: Gilles Bailleul, Montesson, France; Tjerk Sannes, Eindhoven, Netherlands

[73] Assignee: U.S. Philips Corporation, New York, N.Y.

[21] Appl. No.: 846,506

[22] Filed: Mar. 28, 1986

Related U.S. Application Data

[63] Continuation of Ser. No. 670,514, Nov. 13, 1984, abandoned.

[30] Foreign Application Priority Data

Nov. 21, 1983 [FR] France .................. 83 18487

[51] Int. Cl.$^4$ .............................. H01B 13/00
[52] U.S. Cl. .......................... 29/828; 29/614; 29/615; 174/102 P; 174/118
[58] Field of Search ............ 174/102 P, 118, 15 R, 174/15 S, 15 C, 16 R, 18, 152 R, 47; 338/238, 239, 240, 241, 242; 29/614, 615, 828

[56] References Cited

U.S. PATENT DOCUMENTS

| | | | |
|---|---|---|---|
| 240,236 | 4/1881 | Delany | 174/118 |
| 1,127,281 | 2/1915 | Read | 174/118 |
| 1,157,916 | 10/1915 | Wentworth | 174/118 |
| 2,074,777 | 3/1937 | Coupier | 174/118 |
| 2,334,756 | 11/1943 | Eichinger | 174/102 P |
| 2,341,235 | 2/1944 | Palmer | 174/102 P |
| 2,731,532 | 1/1956 | Mathisen | 29/614 |
| 2,831,951 | 4/1958 | Desloge | 29/614 |
| 2,861,162 | 11/1958 | Inthoudt | 29/615 |
| 3,061,808 | 10/1962 | Wiegand | 338/238 |
| 3,825,669 | 7/1974 | Korner et al. | 174/151 X |
| 4,039,740 | 8/1977 | Iwata | 174/155 |
| 4,314,401 | 2/1982 | Saku | 29/615 |

FOREIGN PATENT DOCUMENTS

| | | | |
|---|---|---|---|
| 2638209 | 3/1978 | Fed. Rep. of Germany | 174/15 C |
| 971987 | 1/1951 | France | 174/47 |
| 2518752 | 6/1983 | France | |
| 530574 | 12/1940 | United Kingdom | 174/118 |

*Primary Examiner*—Morris H. Nimmo
*Attorney, Agent, or Firm*—Norman N. Spain

[57] ABSTRACT

A cable which is insulated by means of mineral insulation material and which comprises one or more hollow electric conductors, a mineral insulation material provided around the conductor(s) and a metal sheath, the ends of said cable being sealed in a moisture-tight manner and having a passage for the central conductor(s), as well as a method of manufacturing the cable.

6 Claims, 5 Drawing Figures

SCREENED CABLE INSULATED BY MEANS OF MINERAL INSULATION MATERIAL AND METHOD OF MANUFACTURING SUCH A CABLE

This is a continuation of application Ser. No. 670,514, filed Nov. 13, 1984, now abandoned.

The invention relates to a cable insulated by means of mineral insulation materials which cable comprises central electrical conductors, a mineral insulation material provided around the conductor(s), and a metal sheath, the ends of said cable being sealed in a moisture-tight manner by means of plugs through which the conductor(s) pass, and having a passage for the central conductor(s). The cable is used for example in the electric connection of gauges (sealed from the atmosphere).

An example of such a cable is of one known as "Thermocoax". A suitable mineral insulation material is, for example, magnesium oxide or aluminum oxide, in a strongly compressed powder form. The ends of the cable are sealed by a plug, which prevents the penetration of moisture, and have a passage for the central conductor.

The metal sheath generally is of stainless steel or a nickel alloy. It ensures the desired gas- and moisture-tightness, the good mechanical behaviour and generally forms a protection of the central conductor against external chemical influences.

The central conductor(s) is/are often manufactured from the same material as the sheath, which give the cable better mechanical properties. Said conductor(s), however, may be, for example, made of copper when a better electrical conductivity is desired. In this case the cable can withstand temperature of at most 800° C.

The cables insulated by means of mineral insulation materials may be usefully employed as the electrical connection between a gauge and a measuring apparatus in an atmosphere which makes the use of an organic insulation material impossible. A large number of plants operating at a high temperature, or at a high pressure, or in a vacuum or in a radio-active radiation, are supervised and checked by sealed gauges. These gauges may be gauges of pressure, vibration, deformation or ionizing particles. The electric connection of such gauges can be provided by means of a cable insulated by means of mineral insulation materials, with the proviso that the cables are connected to the gauges in a gas-tight manner.

However, such an application shows certain disadvantages in practice. For a plant which operates, for example, at a high temperature, the pressure of the gas which is sealed in the gauge increases as well as the gas which is present in the connection cable. As a result, if the cable serves as the connection to a pressure gauge or a capacitive strain gauge, for example, deviations in the measurements occur.

One might think that the permeability of the "bed" of insulating powder between the central conductor and the metal sheath is sufficient to absorb said excessive pressure. This is incorrect for two reasons.

The first reason is that the screened cable, as already stated, is sealed in a gas-tight manner at each end. In effect, a barrier must be provided between the mineral powdered insulation material which is hygroscopic and the moisture of the ambient air to maintain a good electrical insulation between the central conductor and the sheath.

The second reason is that the permeability of the insulation material is very small, although this latter is in powder form, and that the cable lengths used, which may be 50 meters, are too long to enable the flowing away of the undesired gas in a comparatively short period of time.

It is the object of the invention to mitigate these disadvantages by providing a new cable insulated with mineral insulation materials. This object is achieved more in particular by means of a cable of the type mentioned in the opening paragraph which is characterized in that the central conductor(s) is/are hollow throughout its/their length(s).

In these circumstances, the gases collected in the gauges which may produce undesired effects under the influence of temperature and hence of pressure may be removed through the duct which is formed by the interior of the central conductor so that the operation of the gauge is not disturbed.

The invention also relates to a method of manufacturing a cable insulated by means of mineral insulation materials as described in the opening paragraph, in which a cable having a diameter exceeding the diameter of the ultimate cable is subjected to a mechanical treatment, the length of the cable being extended and the diameter being reduced, and the cable being periodically subjected to a thermal restoring treatment (annealing).

Such a method is well-known in the art. The mechanical treatment may be a drawing process, a rolling process or a hammering process. As a result of the treatment the diameter is reduced approximately by a factor of 10. A description of the various treatment methods is given, for example, in French Patent Application No. 81 23 709, filed by Applicant on Dec. 18, 1981.

During the reduction of the diameter of the cable by any of these methods the metal of the central conductor and of the sheath is hardened and becomes mechanically resistant to the treatment. In order to be able to continue the mechanical treatment chosen until the ultimate diameter has been obtained, it is necessary to perform, during the mechanical treatment, periodically a thermal, metallurgical restoring treatment.

The thermal treatment (annealing process) differs in accordance with the materials which form the central conductor and the sheath. For example, for materials such as stainless steel or nickel alloys, the most frequently used materials, the thermal treatment is a hardening at 1000° C. For other materials, for example, aluminum, copper or titanium, the annealing temperature will be lower and will be, for example between 300° and 700° C.

A drawback of the above-mentioned known method is that the hollow central conductor is flattened and the axial aperture (cavity) of the central conductor(s) becomes clogged partly or totally.

It is of importance for the cavity to be perfect throughout the length of the cable.

The invention provides a method which does not exhibit the above-mentioned disadvantage.

According to the invention this is achieved by means of a method of the type mentioned hereinbefore which is characterized in that the hollow central conductor(s), prior to the mechanical treatment, is/are filled with a material which can withstand the strong pressure of the mechanical treatment and the high temperature of the thermal treatment and which in addition can be removed entirely when the treatments are terminated and the diameter desired for the cable is reached.

In a favorable embodiment of this manufacturing method the hollow central conductor is filled with a sodium metal silicate which can withstand annealing to 1000° C. and which is removed from the cavity after the mechanical and thermal treatments by washing.

According to another favorable embodiment of this manufacturing method the hollow central conductor is filled with a metal in which the hollow conductor during the mechanical and thermal treatments is closed at each end, said metal after said treatments being removed in a liquid form.

A suitable metal which is used in a solid and a liquid form is tin or lead which withstand an annealing treatment up to 1000° C.

According to another favorable embodiment of the manufacturing method a material is used for filling the hollow central conductor the sublimation temperature of which is higher than the annealing temperature and which after termination of the mechanical and thermal treatments is removed by sublimation.

A suitable sublimating material is gallium fluoride or gallium nitride, the sublimation temperature of which is approximately 800° C., germanium nitride, germanium sulfide or indium sulfide the sublimation temperature of which is approximately 600° C., or ammonium chloride the sublimation temperature of which is 340° C.

Figures 1B, 1C:
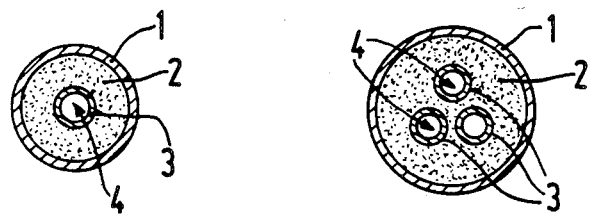
Figure 2A:
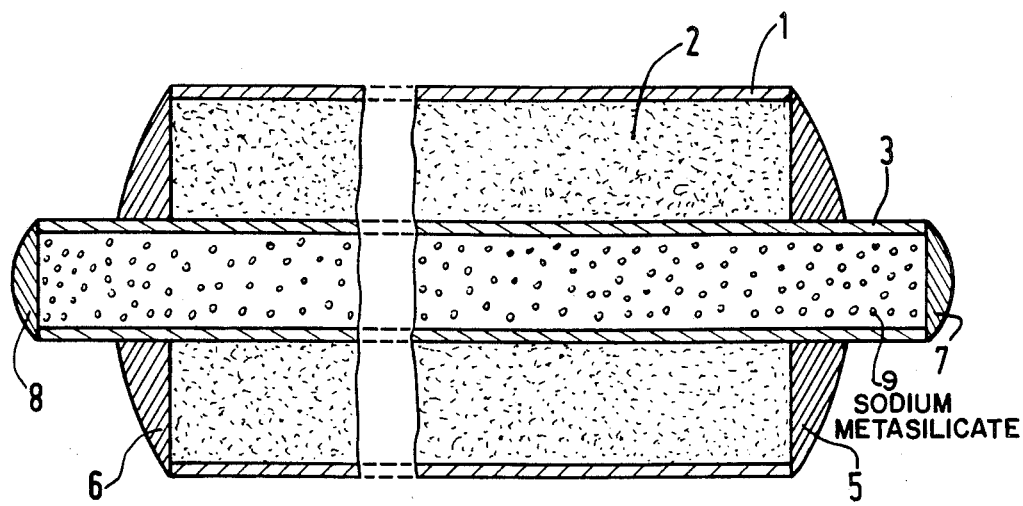
Figure 2B:
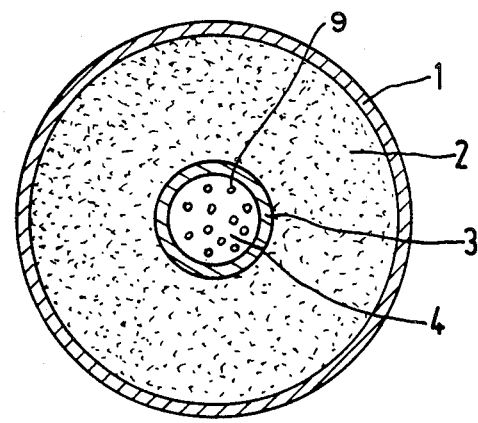

The invention will now be described in greater detail with reference to the accompanying drawing, in which:

FIG. 1a is a longitudinal sectional view of a cable according to the invention having a single central conductor, FIG. 1b is a cross-sectional view of the cable shown in FIG. 1a, FIG. 1c is a cross-sectional view of a cable having three central conductors, FIG. 2a is a longitudinal sectional view of a cable according to the present invention before its diameter was reduced, and FIG. 2b is a cross-sectional view of the cable shown in FIG. 2a.

As shown in FIGS. 1a and 1b the cable according to the present invention comprises a metal cylindrical sheath 1 manufactured, for example, from stainless steel or a nickel alloy. The cable furthermore comprises a hollow cylindrical central conductor 3 having an axial duct 4. Generally, but not necessarily, the hollow central conductor is manufactured from the same metal as the sheath. The intermediate space between the sheath 1 and the central conductor 3 is filled with a mineral insulation material 2, for example, magnesium oxide or aluminium oxide in powder form. Sealing plugs 5 and 6 having an aperture for the central conductor 3 are provided at the ends of the cable.

In manufacturing a cable starting from one having a central conductor having an internal diameter of 0.5 to 3 cm in which is to be reduced to 1–3 mm procedure, a feature of which is shown in FIG. 2a and 2b may be employed. For this purpose, the duct 4 of the hollow conductor 3 is filled with a material capable of withstanding the drawing, rolling or hammering operations, as well as the high temperature annealing treatment. A suitable material is sodium metasilicate. This product is in the form of a powder having a melting point of 1088° C. During the mechanical treatments and the annealing treatment to at most 1000° C. the duct 4 is not flattened or obstructed. Due to the high annealing temperature the sodium metasilicate is particularly suitable for the manufacture of cables with metals which have to be subjected to a curing treatment, for example, stainless steel or nickel alloys.

The sodium metasilicate is finally dissolved in water and in this manner removed from the hollow conductor 3. For this purpose the cable can simply be emerged in water or water may be injected into the hollow conductor.

The axial duct 4 may alternatively be filled with a metal the boiling-point of which is higher than the annealing temperature used during the manufacture. An example of a suitable metal is lead having a melting temperature of 327.5° and a boiling temperature of 1740° C.

Tin may also be used. Tin has a melting temperature of 232° C. and a boiling temperature of 2270° C. After filling the duct 4 with the metal introduced in powder form, the two ends of the hollow central conductor 3 are sealed by closing plugs 7, 8. The diameter of the cable is reduced by the above-mentioned mechanical treatments alternated by a thermal treatment. During the thermal treatment the metal is in a liquid form. When the cable has reached the ultimate diameter the plugs 7, 8 are removed. The cable is heated at a temperature at which the metal in the conductor 3 is fluid. The fluid. The fluid metal is removed by compressed air.

The duct 4 of the hollow central conductor 3 may also be filled with a material which sublimates at a temperature which is higher than the annealing temperature used. Suitable materials are ammonium chloride which sublimates at 340° C., so that annealing to 300° C. is possible, gallium fluoride and gallium nitride which sublimate at 800° C. and which permit of annealing to 750° C., germanium nitride and germanium sulfide, as well as indium sulfide which sublimate at 600° C. and permit of annealing to 550° C. These materials are used when the sheath 1 and the central conductor are manufactured from copper, aluminum or titanium.

When this latter method is used the duct 4 of the central conductor is hence filled by means of one of these materials and is sealed by the plugs 7 and 8, after which the cable is subjected to various treatments by which its diameter can be reduced in the desired ratios.

As soon as the diameter of the cable has been reduced to the desired value the plugs 7 and 8 are removed and the cable is heated at the sublimation temperature of the selected material as a result of which the material can be removed from the conductor 3.

The main advantage of the use of a hollow central conductor is that it allows the removal of undesired gases.

An extra advantage is obtained if the cable if used for the electric connection of nuclear gauges which are provided in a special atmosphere, for example helium 3(3/2He) or mixtures of argon and nitrogen. By using the cable according to the invention these gases can be introduced after the installation of the gauge.

The pressure of the gas atmosphere can also be controlled and the gas atmosphere can be varied at any desired instant.

FIG. 1c shows a screened cable according to the present invention having three central conductors. If the screened cable shows several central conductors either one or all conductors may have an axial cavity, in accordance with its application.

It will be obvious that various modifications are possible both in the form and the dimensions of the cable according to the present invention, as well as in the manufacturing method, without departing from the scope of the present invention as defined in the claims.

What is claimed is:

1. A method of manufacturing a cable insulated with mineral insulation material and comprising a central electrical conductor unfilled hollow throughout its length, said mineral insulation material provided around said central conductor, a metal sheath surrounding said central electrical conductor and said insulation material, said central conductor extending along the length of said cable, and the ends of said cable being sealed in a moisture-tight manner by means of plugs through which said central conductor passes, said method comprising subjecting a hollow central conductor having a reducible diameter exceeding that of the desired conductor to a mechanical treatment for increasing the length of, and thereby reducing the diameter of said conductor having said reducible diameter while being periodically subjected to an annealing treatment characterized in that prior to commencement of said mechanical treatment said hollow conductor having said reducible diameter is filled with a material capable of withstanding the pressure of said mechanical treatment and the temperature of said annealing treatment and said material is removed from said conductor having said reducible diameter when said treatments are terminated and the diameter of said conductor having said reducible diameter has been reduced to the desired value.

2. A method as claimed in claim 1, characterized in that said hollow central conductor having said reducible diameter is filled with a sodium metasilicate which can withstand annealing to 1000° C. and which is removed by washing from the hollow conductor(s).

3. A method of manufacturing a cable provided with a central electrical conductor unfilled and hollow throughout its length, with mineral insulation material provided around said central electrical conductor and a metal sheath surrounding said central electrical conductor and said insulation material, said central conductor extending along the length of said cable and the ends of said cable being sealed in a moisture-tight manner by means of plugs through which said central electrical conductor passes, said method comprising subjecting a hollow central conductor having a reducible diameter exceeding that of the desired central conductor to a mechanical treatment for increasing the length and thereby reducing the diameter of the conductor of said reducible diameter while being periodically subjected to an annealing treatment, characterized in that prior to the commencement of said mechanical treatment said hollow conductor of said reducible diameter is filled with a material, the sublimation temperature of which is higher than the annealing temperature, and which material can be removed, after said treatment, by sublimation from said conductor, of said reducible diameter, and, when said treatments are terminated and the diameter of said conductor of said reducible diameter has been reduced to the desired value, said material is removed by sublimation.

4. The method of claim 3 wherein the central conductor the diameter of which exceeds that of the desired conductor is filled with a material selected from the group consisting of gallium fluoride, gallium nitride, germanium nitride, germanium sulfide, indium sulfide and ammonium chloride.

5. A method of manufacturing a cable provided with a central electrical conductor, hollow throughout its length, with mineral insulation material provided around said central electrical conductor, a metal sheath surrounding said central electrical conductor and said insulation material, said central conductor extending along the length of said cable and the ends of said cable being sealed in a moisture-tight manner by means of plugs through which said central electrical conductor passes, said method comprising subjecting a hollow central conductor having a reducible diameter to a mechanical treatment for increasing the length and thereby reducing the diameter of said conductor of said reducible diameter while said conductor of said reducible diameter is periodically subjected to an annealing treatment, characterized in that prior to commencement of said mechanical treatment said hollow conductor of said reducible diameter is filled with a metal capable of withstanding the pressure of said mechanical treatment and the temperature of said annealing treatment, is closed at each end during said mechanical and thermal treatment and, when said treatments are terminated and the diameter of said conductor of said reducible diameter has been reduced to the desired value, said metal is removed in liquid form.

6. A method of manufacturing a cable provided with a non-filled central electrical conductor, hollow throughout its length, with mineral insulation material provided around said central electrical conductor and a metal sheet surrounding said central electrical conductor and said insulation material, said central conductor extending along the length of said cable and the ends of said cable being sealed in a moisture-tight manner by means of plugs through which said central electrical conductor passes, said method comprising subjecting a hollow central conductor having a reducible diameter exceeding that of the desired central conductor to a mechanical treatment for increasing the length and thereby reducing the diameter of the conductor of said reducible diameter while being periodically subjected to an annealing treatment, characterized in that prior to the commencement of said mechanical and annealing treatments, said hollow conductor of reducible diameter is filled with metal capable of withstanding the pressure of said mechanical treatment and the temperature of said annealing treatment, said metal being selected from the group consisting of tin and lead, an annealing temperature of up to 1000° C. is employed, the resultant filled conductor is closed at each end during said mechanical and annealing treatments and, when said treatments are terminated and the diameter of said reducible diameter has been reduced to the desired value, said metal is removed in liquid form thereby producing the non-filled hollow conductor having a diameter of the desired value.

* * * * *

UNITED STATES PATENT AND TRADEMARK OFFICE
CERTIFICATE OF CORRECTION

PATENT NO. : 4,679,317

DATED : July 14, 1987

INVENTOR(S) : Gilles Bailleul et al

It is certified that error appears in the above-identified patent and that said Letters Patent is hereby corrected as shown below:

IN THE CLAIMS

Claim 1, line 3 after "unfilled" insert --and--

Signed and Sealed this

Thirty-first Day of January, 1989

Attest:

DONALD J. QUIGG

*Attesting Officer*  *Commissioner of Patents and Trademarks*